Jan. 2, 1940.　　　　W. S. BURGESS　　　　2,185,430
HIGH SPEED DISPLACEMENT TYPE HULL
Original Filed July 30, 1936　　10 Sheets-Sheet 1

Jan. 2, 1940. W. S. BURGESS 2,185,430
HIGH SPEED DISPLACEMENT TYPE HULL
Original Filed July 30, 1936 10 Sheets-Sheet 3

Jan. 2, 1940.  W. S. BURGESS  2,185,430
HIGH SPEED DISPLACEMENT TYPE HULL
Original Filed July 30, 1936  10 Sheets-Sheet 4

Jan. 2, 1940.   W. S. BURGESS   2,185,430
HIGH SPEED DISPLACEMENT TYPE HULL
Original Filed July 30, 1936   10 Sheets-Sheet 5

Jan. 2, 1940.    W. S. BURGESS    2,185,430
HIGH SPEED DISPLACEMENT TYPE HULL
Original Filed July 30, 1936    10 Sheets—Sheet 6

INVENTOR
William Starling Burgess
BY
Cooper, Kerr + Dunham
ATTORNEYS

Jan. 2, 1940.  W. S. BURGESS  2,185,430
HIGH SPEED DISPLACEMENT TYPE HULL
Original Filed July 30, 1936  10 Sheets-Sheet 8

INVENTOR
William Starling Burgess
Cooper Kerr & Dunham
ATTORNEYS

Patented Jan. 2, 1940

2,185,430

UNITED STATES PATENT OFFICE 2,185,430

HIGH SPEED DISPLACEMENT TYPE HULL

William Starling Burgess, Wiscasset, Maine, assignor to Aluminum Company of America, Pittsburgh, Pa., a corporation of Pennsylvania Application July 30, 1936, Serial No. 93,358
Renewed November 18, 1938

18 Claims. (Cl. 114—56)

Heretofore various attempts have been made to provide hulls capable of high speed operations. Such previous high speed hulls were usually of the planing or partially planing type with or without steps. Such former hulls have been used successfully in small sizes and in smooth water. While high speed operation is obtainable with such hulls, such hulls are unseaworthy and cannot be built in large sizes owing to the impossibility of making a structure sufficiently strong for its weight to resist the pounding to which the hulls are subject in a seaway. The maneuverability of high speed hulls of such previous types is furthermore exceedingly poor; so poor, in fact, that at high speeds it has been found essential to use bow rudders. Bow rudders are impractical for use in large vessels on account of their vulnerability, due to position and on account of the impracticability of docking a large vessel having a bow rudder. Furthermore, the usual planing boat of to-day has such excessive beam for her length or such a low $$\frac{L}{B}$$

ratio that the boat's rolling in a seaway is too quick to permit the use of the boat as a gun or torpedo platform. In other words, previous high speed boats have a metacentric height altogether too great for such use.

Displacement type hulls on the other hand, afford the desired seaworthy characteristics and steadiness, but are incapable of being driven at extremely high speeds with any reasonable amount of power. For certain uses, such as destroyers, the displacement type of hull only has heretofore been used.

Generally stated, the present invention has for one of its objects, the provision of a displacement type hull having such characteristics that it will partially plane at speed to such an extent that it will rid itself of a substantial part of its static area of wetted surface.

Another object of the present invention resides in the provision of a hull of displacement type having higher speed characteristics for a given power and weight than previous hulls of this type.

Another object of the present invention resides in the provision of a hull having improved seaworthy characteristics over the characteristics previously obtainable with such high speed hulls.

Another object of the present invention resides in the provision of a hull having maneuverability characteristics not previously obtainable in high speed hulls.

Another object of the present invention resides in the provision of a hull of such type that the maneuverability thereof can be maintained through all ranges of speed.

Another object of the present invention resides in the provision of a hull adapted for high speed operation which is adapted to substantially reduce its wetted surfaces at speed and which is also adapted to maintain displacement characteristics with improved lateral stability at all speeds.

Another object of the present invention resides in the provision of a hull of the displacement type having improved longitudinal stability characteristics.

Another object of the present invention resides in the provision of a novel hull form whereby improved characteristics of wake may be obtained including a substantial lowering of the height of the stern wave to the general end that resistance may be reduced.

Another object of the present invention resides in the provision of a hull provided with novel stream deflectors disposed in a novel relation and adapted to clear the hull sides of water at speed and form a trough alongside the hull and also cooperating with the rudder to provide for sharp turns at speed.

One and a principal object of the present invention resides in the provision of a hull form capable of operation at extremely high speeds. Heretofore, very high speeds have been obtainable only in specially built and powered racing boats whose lengths are comparatively short as compared to vessels such as destroyers or coastal launches now in use. With the hull forms herein described high speeds compatible or even higher than racing boat speeds are obtainable in lengthy hulls, for example one as long as 250 feet.

Another object of the present invention resides in the provision of a hull adapted for high speed operation having an improved bottom configuration which will produce a relatively small bow wave at speed.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Fig. 4 also shows the stream deflectors.

Fig. 7 is a bow view which shows clearly the bottom and side portions of the forebody of the hull of Figs. 1, 1a, 2 and 2a.

Figs. 8 and 9 are detail views showing the action of the stream deflectors. Fig. 8 shows a deflector submerged in the water and Fig. 9 shows a trough formed by the action of the deflector at a determined speed.

Fig. 14 is a body plan view similar to Fig. 5, but pertaining to the vessel, shown in Figs. 13 and 13a.

Fig. 16 is a body plan of the vessel shown in Figs. 15 and 15a.

Figure 4:
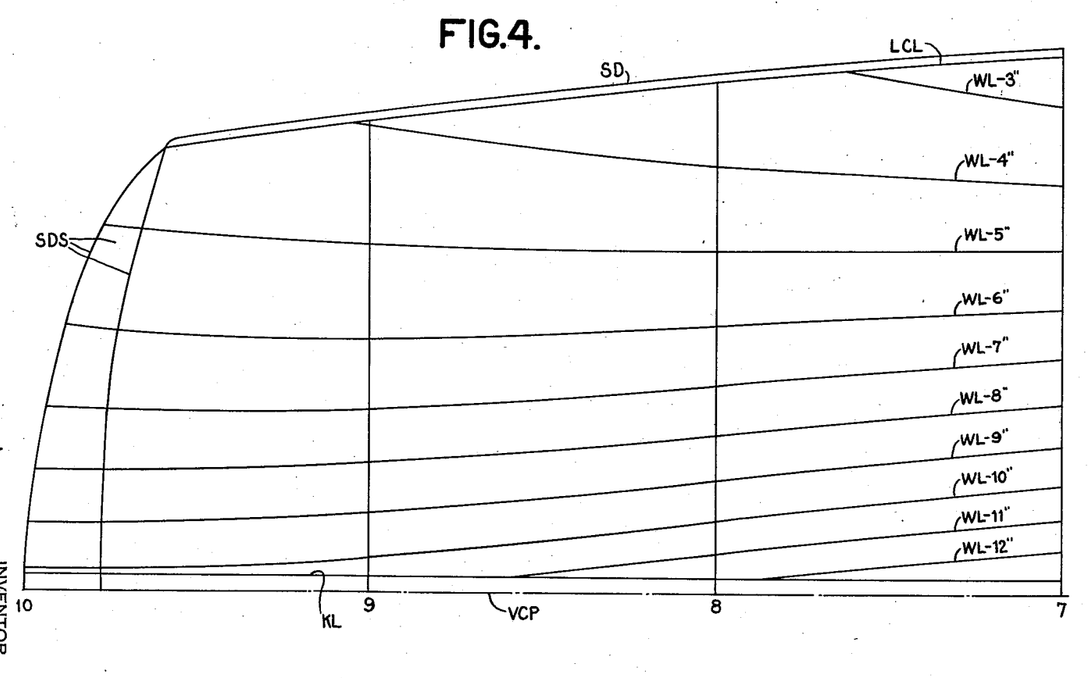
Figs. 4 and 4a taken together, with Fig. 4a to the right of Fig. 4, are diagrammatic views of additional water lines of the afterbody.
Figure 4A:
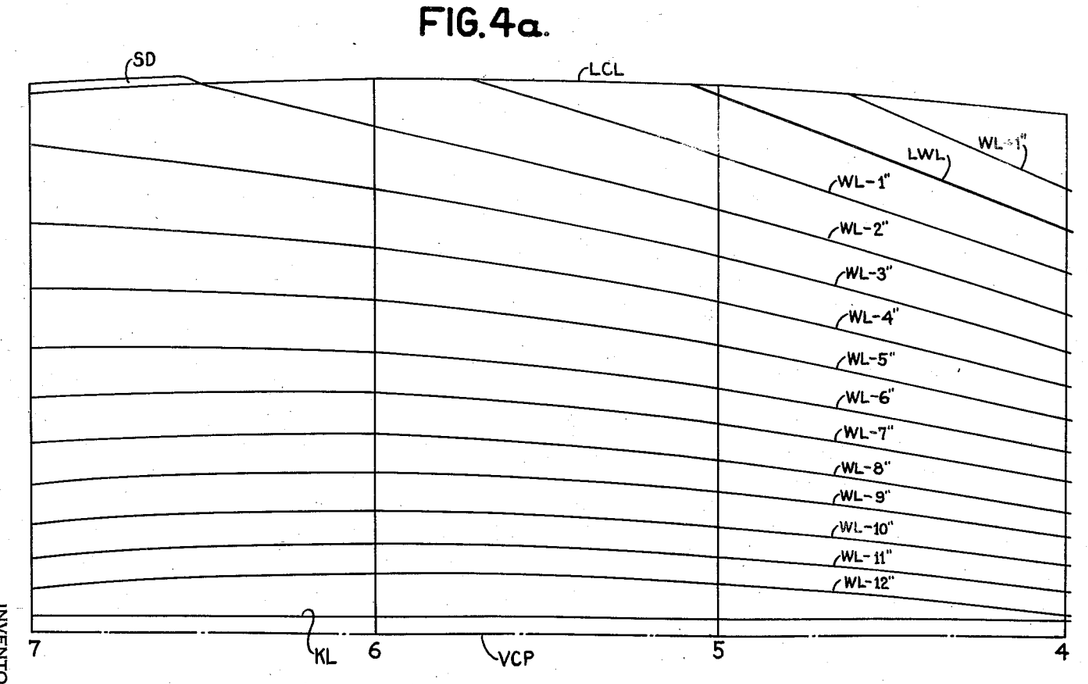

In the various drawings, similar reference characters will be used on different views and conventional marine nomenclature will be adapted. The reference letters BLP—1, BLP—2, BLP—3, etc., will refer to buttock line planes. The reference letters B—1, B—2, B—3, etc., will be used to refer to the buttock lines on correspondingly numbered planes. The buttock lines of the bottom comprise the lines of inter-section of the bottom surface with longitudinal vertical planes (such as BLP—1, BLP—2, etc.) parallel to the fore and aft vertical center line plane of the hull. The reference letters LWL will be used to refer to the load water line plane of the hull at rest and loaded. Various other water lines will be referred to and these will be given distinctive numbers and + or — designations to signify whether the water line is above or below the load water line, thus WL+4, WL—1, etc. Certain water lines, as shown on Figs. 4 and 4a, particularly those referring to the hull delineated in Figs. 1 and 1a, 2 and 2a, will be specified by the distances in inches above or below the load water line. Thus WL—6″ will refer to the water lines on a plane taken 6″ below the water line of this particular hull. Such "inch" water line designations are only used on Figs. 4 and 4a. The reference letters UCL and LCL will be used to refer to the upper and lower chine lines and LCL will be used where there is only one chine line.

In the various views, the stations will be numbered with numerals and for convenience, stations from 0 to 10 have been delineated for simplicity of illustration. Deadrise angles will also be referred to and such deadrise angles will be understood to comprise the angles between the horizontal and the chord lines of the bottom which extend from the keel knuckle to the lower chine line. The reference character VCP will be used to refer to the vertical center line plane or the fore and aft plane of symmetry of the hull. The line of the keel knuckle will be defined by the reference character KL and the deck line by the reference character DL. Reference character BT will be used to refer to the bottom portion or portions of the various hulls. Reference characters S—1, S—2 and S—3 will be used to refer to the side portion or section of the several hulls and reference character TS will be used to refer to the top sides.

Hereinafter the terms "length beam ratio", "speed length ratio" and "displacement length ratio" will be referred to. Length beam ratio is the length in feet divided by the beam in feet and is expressed $$\frac{L}{B}$$

Speed length ratio is the maximum speed in knots per hour divided by the square root of the length in feet and is expressed $$\frac{V}{\sqrt{L}}$$

Displacement length ratio is the displacement in long tons divided by the cube of another ratio, such ratio comprising the length in feet divided by 100. Displacement length ratio is expressed thus $$\frac{D}{\left(\frac{L}{100}\right)^3}$$

A speed horsepower formula will also be referred to. This formula is one customarily used to calculate the optimum speed obtainable with high speed hulls having a length ranging from 30 to 45 ft. Such formula is expressed as follows:

$$\frac{\text{Weight in lbs.}}{\text{Shaft H. P.}} = \frac{C}{V^3}$$

C=36,000 if V is miles per hr. and C=27,150 if V is knots per hr.

Figure 12:
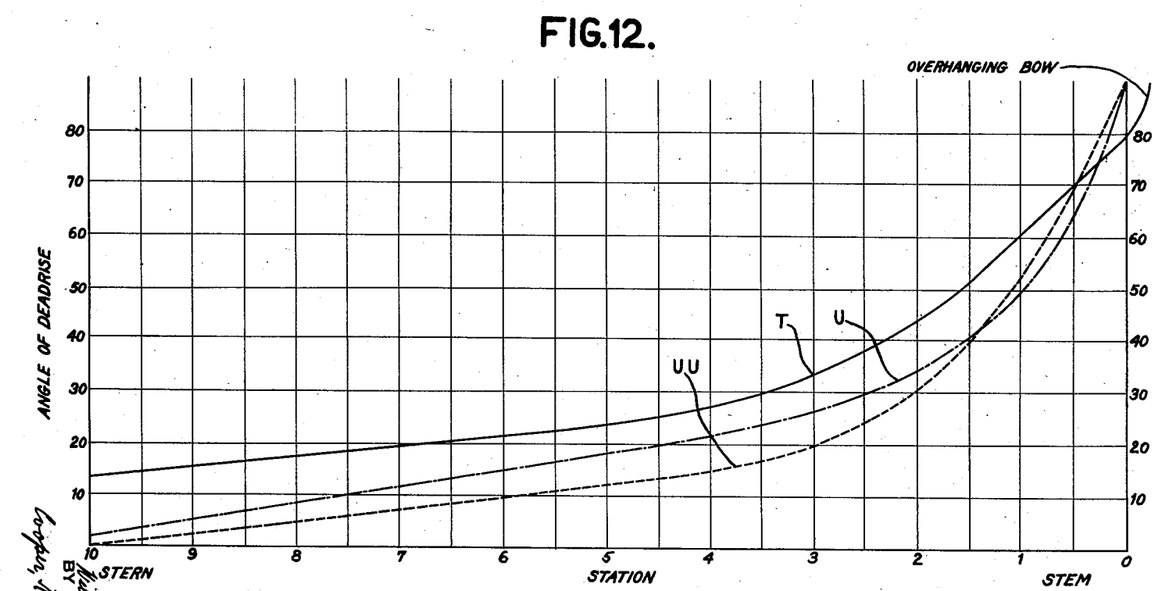
Fig. 12 is a curve diagram showing variations in the angle of deadrise along the length of the bottom of the vessel and this view by certain supplemental curves shows corresponding deadrise angles of other high speed hulls now in common use.

Generally stated, the improved hull comprises a bottom portion, which, at each side of the center line plane, is concave in transverse cross-section at all points throughout the length of the hull. The buttock lines of the bottom are convex in the forebody and become concave towards the stern. The angles of deadrise are substantially increased over the angles of deadrise in previous high speed hull forms now in common use (see Fig. 12). Along the afterbody and particularly at the stern, the angles of deadrise are considerably greater than the angles of deadrise now in common use. The configuration of the bottom is such that the angles of deadrise progressively slowly increase from the stern to the midship section and thereafter progressively increases more rapidly as the bow is approached. Typical and suitable deadrise angles are 13.25° at the stern, 24° amidships, 37.5° at ¼ of the length abaft the stem, 79° closely adjacent the bow or stem and 90° at the bow itself. My invention is, however, not limited to such angles specifically, but embraces a considerable variation of angles which will afford the following desired characteristics.

The angles of deadrise at various stations along the bottom of the afterbody provide a dihedral angle configuration of the afterbody bottom which will displace a substantial volume of water and extend relatively deeply into the water at all points and sections of the afterbody and thereby maintaining substantial displacement characteristics for the hull both at rest and upon the lifting of the same at high speeds. The dihedral angles along the afterbody section of the hull furthermore, provide substantial dynamic stability to the hull when listed and at speed. At relatively low speeds, such dihedral angles of both the afterbody and forebody are also effective in improving lateral stability. In the forebody the angles of deadrise are of progressively increasing degree at the various stations so that pounding in a seaway, which is a common characteristic of present day high speed hulls, will be obviated.

The bottom is also so shaped that the mid-depth water line in the afterbody has a minimum beam not at the transom, as is generally customary with most hulls previously used, but at a point about 10% of the load water line length forward from the transom. This configuration imparts to this water line of the afterbody a somewhat "wasp-like waist" configuration and acts to deflect the water outward at the stern and diminish the height of the stern wave. Accordingly, loss of power attendant upon excessive height of stern wave is minimized.

A further characteristic of the water lines of the afterbody and particularly those water lines above the one just mentioned, is that they reverse in curvature rapidly outward from the center line. The general effect of these water lines is to also throw the water outwards and to reduce the height of the wake. It may be stated that all water lines below the "wasp-like waist" line change their direction of curvature from convex to concave with respect to the center line. The ultimate effect of the configuration of all these water lines in the afterbody is to improve the characteristics of the wake and materially decrease the height of the sternwave. The disposition of the water lines of the hull also cooperate with stream deflectors to cause the flowing streams of water to be diverted away from the stream deflectors.

A further characteristic of the present hull is in the novel disposition of the center of buoyancy. In place of being located amidships, or a little abaft of amidships as heretofore, the center of buoyancy is further aft. In practice, a preferred location of the center of buoyancy is at a point about 62% of the load water line length aft of the stern or more exactly 62% of such length aft of the foremost point of immersion of the vessel loaded and at rest. Such point may be considered as approximately 10% of the water line length aft of amidships.

A further characteristic of the novel hull form resides in the provision of stream deflectors disposed along the line of the lower chine and extending forward from the stern for a distance approximately 33% of the load water line length. Such stream deflectors are set to incline downwardly at an angle of about 30° to the horizontal at all points along their length. These stream deflectors have the function of clearing the sides of the afterbody of water and thus materially reduce the wetted surface. They also cooperate to give additional dynamic lift and are useful in turning and maneuvering.

A further desirable feature of the present invention is in the general configuration and disposition of the rudder which in cooperation with other elements of the hull serve to provide good maneuvering characteristics, the capability of sharp turns and ease in maintaining the vessel upon a given course.

Hulls of the typical forms herein shown and described are adaptable for vessels having a length beam ratio ranging between 6 as a lower limit to 7.5 as an upper limit and having a speed length ratio ranging between lower limits of from 2.5 to 3 to an upper limit ranging between 5.3 and 7.3 and a displacement length ratio ranging between 45 and 50.

In the above formulas, the length is considered as the length between perpendiculars and in the hull form shown in Figs. 1 and 1a, 2 and 2a, the water line at rest is a somewhat less distance and with such hull form, taking water line conditions at rest, the $$\frac{L}{B}$$

ratio of the hull is 6.1.

Tests have demonstrated that the hull form delineated in Figs. 1 and 1a, 2 and 2a and 7, is capable of obtaining speeds materially in excess of the calculated optimum according to the speed horsepower formula previously mentioned. Actual tests have shown that the calculated speed can be exceeded in actual practice by over 9%.

*Side portions*

The side portions may vary somewhat, depending upon the uses to which the vessel is to be put. Stated generally, the side portions (S—1 for example) may have only a slight flare above the lower chine except at the bow where the usual bell shaped bow flare may be provided. For other types of high speed vessels (see Figs. 13 and 13a and 14 and 15 and 15a and 16): for example destroyers, it is preferable to provide side portions S—2 and/or S—3 which are appreciably convex with respect to the chords between the lower and upper chine lines. Such convex curvature may approach the arcs of circles. With types of hulls as shown in Figs. 15 and 15a, wherein upper and lower chine lines UCL and LCL are provided, the upper and lower chine lines are adapted to meet at the bow and to diverge therefrom by a relatively sharp curve (see Fig. 16). In this type of vessel, lines drawn tangent to the bottom surface and tangent to the side surface at the lower chine line define a comparatively small angle at the bow, coincide amidships and become greatest at the stern.

Top sides

For high speed passenger craft, the top sides and side surface portions may comprise a continuous surface S—1 with no marked upper chine line therebetween. At the bow, the customary bell-shaped flare may be provided. However, for some destroyers and like craft, it is preferable to have a distinct top side portion TS (see Figs. 15, 15a and 16) which has a considerable bell-shaped flare at the bow and which gradually fairs into vertical straight lines amidships and abaft amidships. Such top side portion is bounded at the bottom by the upper chine line UCL and at the top of the deck line DL. On other types such as are shown in Figs. 1, 1a, 2 and 2a, 13 and 13a, the upper chine line may coincide with the deck line.

In more detail, in the drawings, referring first to the hull form shown in Figs. 1 to 7, this form comprises essentially warped surface portions on each side of the fore and aft plane of symmetry. Both of said warped surfaces comprise the bottom surface portions BT and the side surface portions S—1. Each bottom surface portion is bounded at the bottom by the line of the keel knuckle KL and at the top by the chine line LCL. The side surface portions S—1 are bounded at the bottom by the chine line LCL and at the top by the deck line DL.

Bottom surface portions

Figures 5, 6:
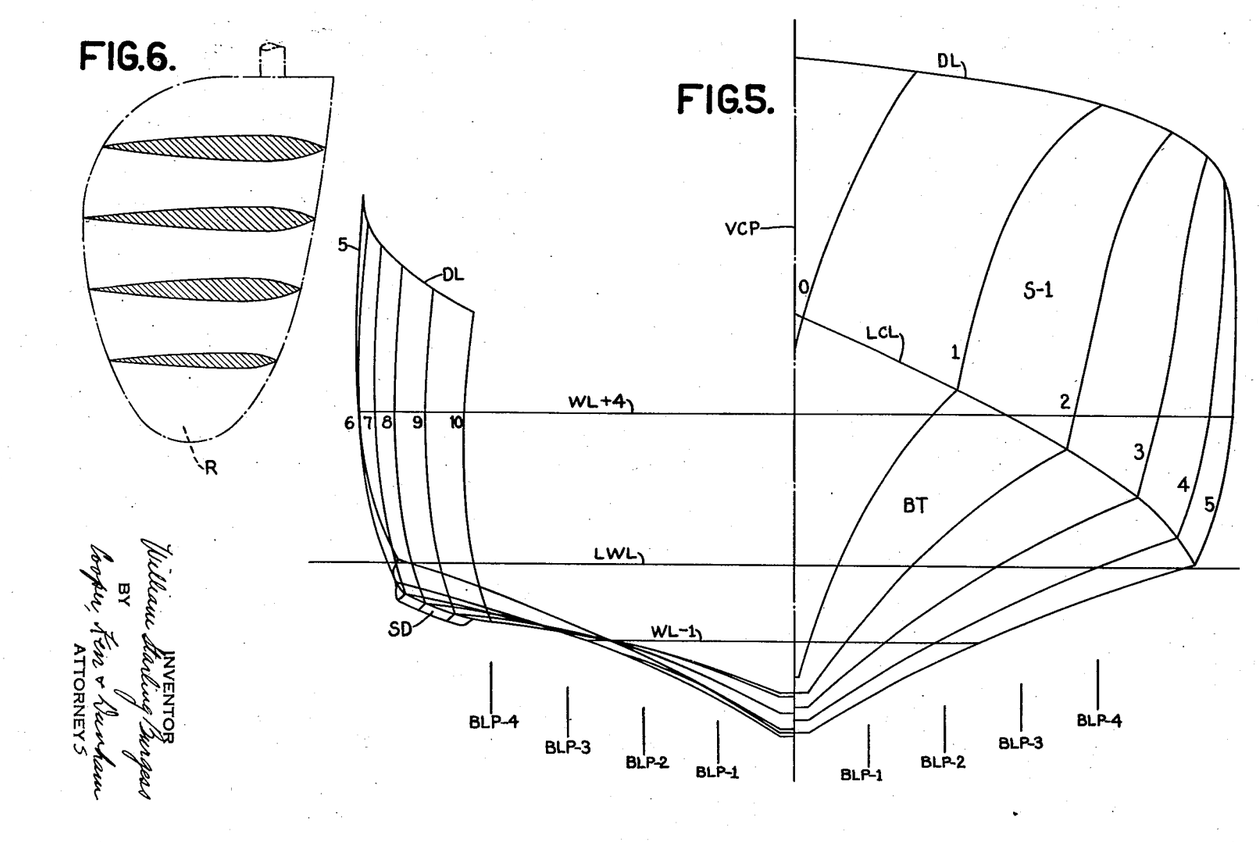
Fig. 5 are views of the fore and aft body plan or cross-sections at the various stations.
Fig. 6 is a view of rudder details with typical transverse cross-sections. The rudder shown in this view is on a larger scale than in Fig. 1.
Figures 7, 8:
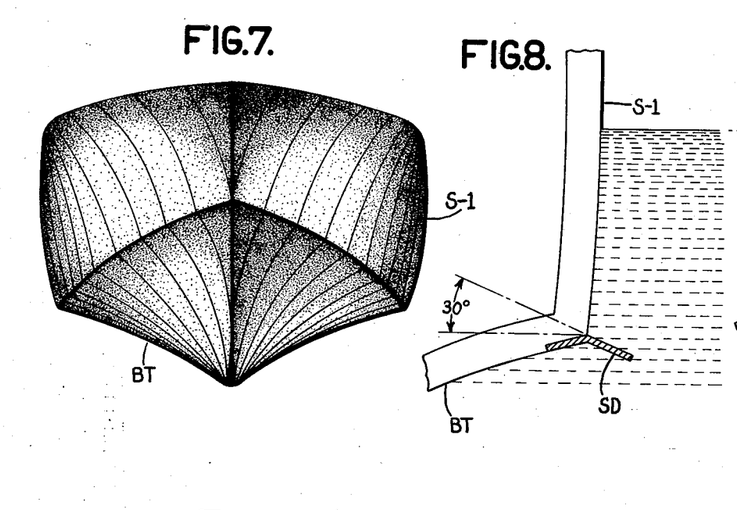
Figure 9:
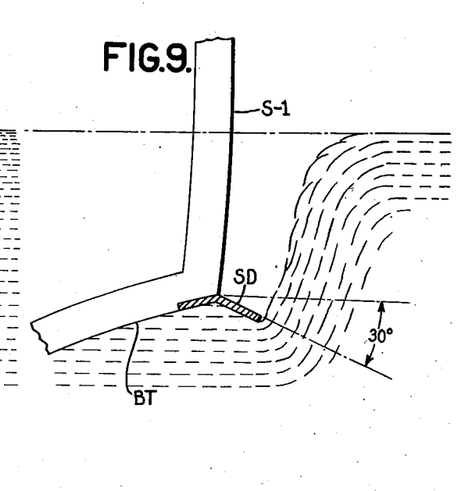
Figure 10:
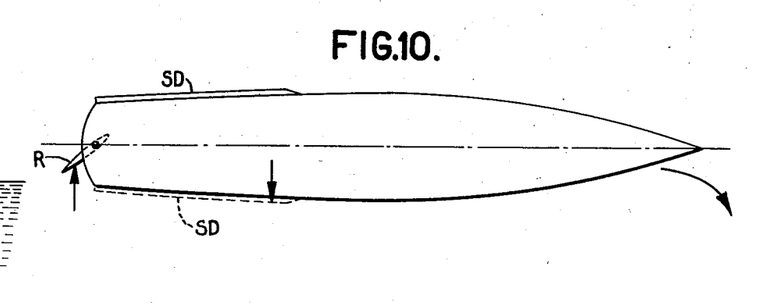
Figs. 10 and 11 are views showing somewhat diagrammatically the action of the stream deflectors and the rudder in maneuvering particularly in making a turn with right rudder.
Figure 11:
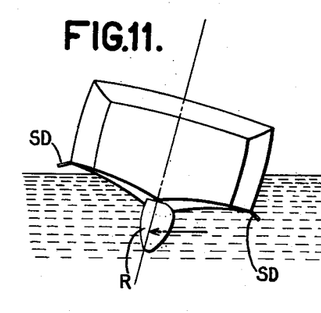

The sections of the bottom surface portions are concave at all points throughout the length of the hull. This will be clear by referring to the superimposed section views of Figs. 1 and 1a and by reference to the body plan view (Fig. 5) which show the concave configuration at the bottom sections at stations 0 to 10. The deadrise angles of the various bottom sections, particularly at the stern, are materially increased over the deadrise angles of high speed hulls now in common use, being twice or more than twice present practice at the extreme stern and being substantially greater over practically all of the bottom (see Fig. 12). As shown in Fig. 5, the angles of deadrise of the various sections start at a relatively large angle to the horizontal adjacent the bow at station 0, and successively decrease from bow to stern until adjacent the stern the angle becomes about 13.25°. It may be further explained that at successive stations forward of the stern the progression of angle increase from station to station is slow at first, but at amidships or slightly forward thereof the progression of angle increase from station to station increases materially. This will be evident from Fig. 12, curve T, showing angles of deadrise, which in practice have been found effective to provide lateral stability characteristics, seaworthy characteristics, improved maneuvering characteristics, and to obviate pounding in a seaway. The substantial degree of deadrise angles in the forebody and the progressive increase in such deadrise at such points are an important factor in providing seaworthy characteristics to the hull in a seaway where there is a tendency to pitch. Pounding is practically obviated even at high speeds by such relation of deadrise angles in the forebody bottom. The provision of increased angles of deadrise in the after section materially improves lateral stability, particularly in a seaway and/or at speed and contribute towards improving the maneuvering characteristics of the hull. Tests have demonstrated that hull structures constructed as described are capable of turning very sharply even at high speeds and upon such turns there is no tendency for reverse bank after the turn is completed when the vessel is again put on a straightway course.

The concave configuration of the bottom in coordination with the progressive decrease of deadrise angles abaft the stem provides a warped or twisted bottom surface of such shape as to reduce and practically eliminate the bow wave through a wide range of speeds. There is a notatably smooth water flow along and under the warped surface of the hull so that there is practically no lateral diversion of water which would produce an appreciable bow wave.

Figure 1:
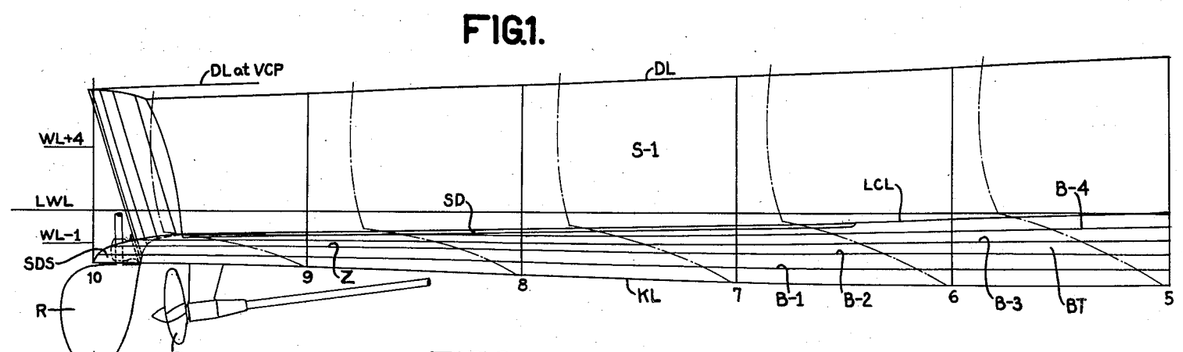
Figures 1 and 1a taken together, with Fig. 1a to the right of Fig. 1, is a longitudinal elevation view of one embodiment of the improved vessel and hull. The forebody of the hull is shown principally on Fig. 1a and the afterbody on Fig. 1.
Figure 1A:
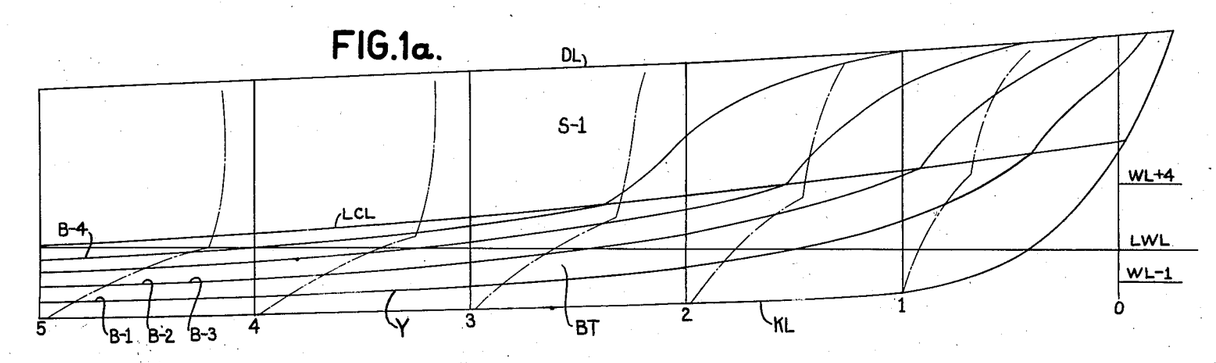
Figure 2:
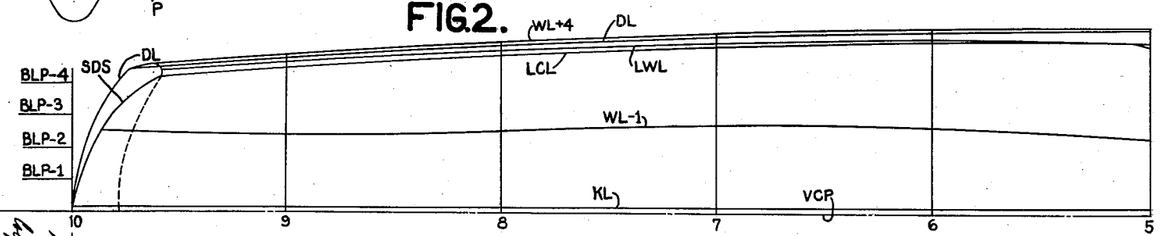
Figs. 2 and 2a taken together, with Fig. 2a to the right of Fig. 2, are half plan views of the after body and forebody respectively.
Figure 2A:
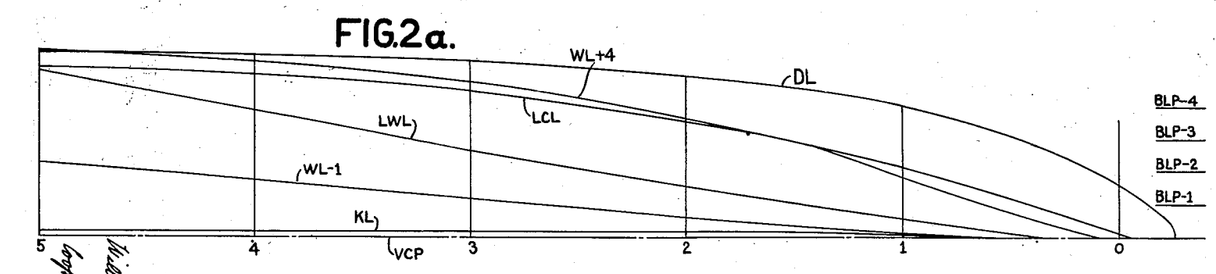
Figure 3:
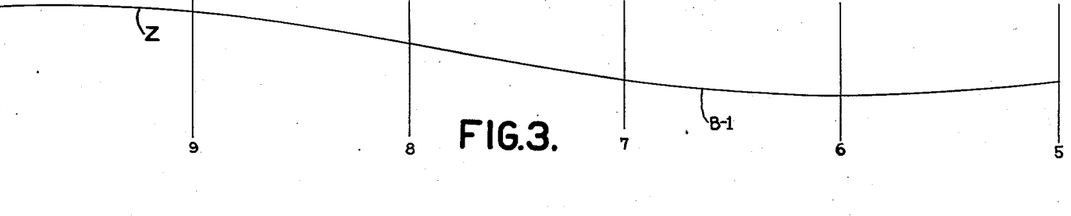
Fig. 3 is a diagrammatic view of a development of a typical buttock line and more particularly, the configuration of a buttock line in the afterbody. In this view the vertical scale in increased with respect to the fore and aft scale to more clearly show the configuration of a typical buttock line and the reversal of curvature of such line in the after section.

The buttock lines B—1, B—2, etc. (see Figs. 1, 1a and 3) are downwardly convex in the region of the forebody (see Y, Fig. 1a) but aft, the buttock lines reverse in curvature at Z (Figs. 1 and 3). It may be mentioned that the buttock lines reverse in curvature at a point or region at about three-quarters of the vessel's water line length, abaft the stem. In this region, which is abaft the center of buoyancy, the buttock lines become concave with respect to the load water line plane. This slight change of curvature of the buttock lines aft is of considerable advantage in reducing resistance and minimizing change of trim. As is well known, as a vessel's speed is increased, the bow starts to lift out of water, the stern settles and the longitudinal trim changes. With the hull delineated, while the hull does change trim somewhat as the speeds are increased, the change of trim is materially less than the change of trim in displacement vessels or planing type hulls. Unlike the change of trim in displacement type vessels which becomes progressively greater as speeds increase, the change of trim of the instant hull reaches a maximum at about ¾ speed beyond which it decreases. In this respect, the recovery of trim is like that of a planing type hull, but it is unlike a planing boat in that the present hull does not rise at the bow to the degree of rise of the planing hull before recovery occurs.

The concave configuration of the bottom, the reversal of curvature of the buttock lines aft and the extreme angle of deadrise, all contribute to bring hydrostatic and dynamic forces into play for lifting the hull at speed and to diminish the wetted surface and to thereby decrease resistance.

The water lines of the afterbody have the characteristics previously explained of directing the water laterally outward and diminishing the wake. Such water lines cooperate with the reverse curvature of the buttock lines in providing a wake which has a very slight sternwave. The bottom configuration is further such that the propeller P works in solid water and thus is extremely effective. The rudder R extends downward below the bottom of the propeller P and thus is adapted to receive not only water from the propeller stream, but also to receive undisturbed water from below the propeller stream. This disposition and arrangement of the rudder improves rudder action both when running at speed and under maneuvering conditions, for example, upon turns, especially upon sharp turns.

By disposing the center of buoyancy well aft, it is possible to provide sharp forward sections which decrease the tendency to pound at high speeds. Furthermore, the disposition of the center of buoyancy aft acts to maintain longitudinal trim.

With the form of vessels shown in Figs. 1 to 7, a stern stream deflector SDS is provided, which, in effect, is an artificial extension of the bottom of the hull. Such extension materially improves the character of the wake as well as the longitudinal trim at speed. Obviously, the hull could be extended aft with the same effect, but the deflector is relatively lighter and decreases displacement as compared to a correspondingly increased hull extension.

The extreme angles of deadrise in the after section all along the afterbody provide increased lateral stability. The dihedral angles afforded by such relatively large deadrise angles in this section of the hull function in water like the dihedral angle of the wings of an aeroplane in air. They provide an increased hydrostatic and dynamic lift upon the heeled over side, affording a righting couple to restore the boat to trim. Such relatively large angles of deadrise in the after body are also a contributing factor in maintaining lateral stability at speed and in keeping the vessel on its course at speed. When the vessel is heeled over, the righting couple reactions are supplemented by the increased displacement of the heeled over side inasmuch as more and more water is displaced by the heeled over side portions of the hull. Such increased displacement effects are accentuated with the hull forms having convex side portions S—2 and S—3 (see Figs. 13 to 16).

It may be explained, that if the deadrise angles be decreased over the angles shown in curve T (Fig. 12) and if the displacement length ratio be kept constant, the wetted surface will be increased because the beam must be increased to maintain the same displacement. Such changes of hull configuration will decrease seaworthiness and the attainable speed will also be decreased, because of the increase of wetted surface. The hull forms herein delineated and described, obviate such disadvantages and properly correlate speed length ratio, displacement length ratio and beam length ratio with such configuration of the hull, particularly in the bottom portion, as to provide seaworthiness, increased attainable speed, improved lateral stability and improved maneuverability.

The curve diagrams (Fig. 12) show comparative deadrise angles at various stations from station 0 adjacent the stem to station 10 adjacent the stern. The curve marked "T" shows the correlation of deadrise angles for the hull forms herein described and shown in Figs. 1 to 7, 13 to 14, 15 and 16. The curve marked "U" shows corresponding deadrise angles at corresponding stations of another high speed hull now in common use and the curve marked "UU" shows such angles for still another high speed hull now in common use. It will be noted from these curves that in the afterbody section aft of station 5, the angles of deadrise of the hull forms which form the subject matter of the present invention, are increased approximately 10° at the stern station and approximately 6° to 7° amidships over the closest current practice adapted by high speed hulls now in common use. In the forebody from stations 5 to 1, the angles of deadrise at all such stations are increased by at least 5° over the closest current practice. The angles of deadrise adjacent the stem from station ½ forward have no particular effect when hulls are driven at speed, but such angles are effective in providing a hull configuration adapted to encounter head seas and to improve the characteristics upon extreme pitching.

Stream deflectors

As shown in Figs. 1, 4, 8, 9, 10 and 11, stream deflectors SD are provided, one at each side of the hull at and along the lower chine line LCL. These stream deflectors extend forward from the stern for a distance approximately 33% of the water line length. Each deflector is so shaped to extend downwardly at an angle of 30° from the horizontal and this angle is constant for all sections. A preferable and desirable width of each deflector is about .016 of the width of the extreme beam. Each stream deflector SD is preferably faired to the hull surface at the forward end. As shown in Fig. 1, the deflector extends along the chine line (lower chine line). The chine line as shown in Fig. 1 crosses the load water line just aft of amidships and at the stern the chine lines are considerably submerged with the vessel at rest or under way at low speeds. The stream deflectors SD are furthermore completely submerged from end to end with the vessel at rest or under way at relatively low speeds (see Fig. 8). At a determined speed, the stream deflectors clear the sides of the afterbody of water (see Fig. 9). Thereafter for all higher speeds the deflectors keep the sides of the afterbody above them clear of water. In this way they serve to materially reduce the wetted surface, thereby reducing frictional resistance and providing additional speed, without increase of power. The function of the deflectors SD, because of their form, should not be confused with that of bilge keels which they superficially resemble, in appearance. While these deflectors function also as bilge keels, they only so function when wholly submerged. Bilge keels do not have the characteristic of creating a trough along the sides of the hull and maintaining such trough as a determined speed is reached or exceeded. It may be mentioned that the deflectors have a subordinate function in assisting in lifting the stern by the dynamic force exerted upon them when the vessel is under way. The stream deflectors SD have another important function in that they cooperate in providing for turns at speed. Upon a right hand turn at speed the first action of the rudder is to cause the boat to heel over or list to the right. This deeply immerses the right hand stream deflector (see Figs. 10 and 11). Such deep immersion of this deflector breaks the trough and water flows again over the deflector up along the sides of the afterbody. During this action of the right hand deflector, the left hand deflector lifts and is kept out of water during the turn. The right hand deflector, thereupon receives upon its under side a force reaction from the water which is normal to and away from the plane of symmetry of the vessel (see Fig. 10). This force reaction cooperates with the force reaction upon the rudder and provides turning couples which assist in sharply turning the vessel to the right. Furthermore, when the air trough over a deflector is destroyed, and water flows over it, the dynamic force which reacted upon the bottom of the deflector when the boat was running at speed straightway is greatly diminished. Also, on a turn, the static buoyancy is built up and hydrostatic pressure is increased upon the heeled over side.

A further characteristic of the present hull in maneuvering, particularly on sharp turns, is that it does not heel over in the opposite direction (i. e., go into a reverse bank as is very common in the present design of vessels) after a turn is completed and the boat is again put on a straightaway course. The provision of a relatively deep rudder also assists turning in that it readily permits throwing the vessel into a bank at the beginning of a turn. Other characteristics of this hull which contribute to the desired maneuverability characteristic, include (a) the extreme angle of deadrise of the bottom sections in the afterbody; (b) the reversal of buttock lines aft which allow a skidding action at the stern upon a turn which promotes sharpness of turn; (c) the raking keel as here provided. Under (c) aforesaid, it is well known that a raking keel affords increased maneuverability, especially in a seaway. In the present hull the keel bottom rakes down in a substantially straight line from the curve of the forefoot for a distance of about one-half of the vessel's length to a point approximately under the center of buoyancy. This configuration of the keel contributes to good maneuverability characteristics.

The hull configuration is such that the bow wave is reduced, the drag at the stern reduced and the characteristics of the wake improved. The boat at speed runs on a more even keel and accordingly, there is less resistance. The configuration of the bow, the displacement of the hull and the configuration of the stern all contribute to minimizing change of trim and decreasing resistance. Furthermore, the hull has the characteristic of reducing its wetted surface at speed by about 25% and this decrease of wetted surface is due principally to the combination of hydrostatic and dynamic lift obtained by the configuration of the bottom supplemented by the action of the stream deflectors in clearing the sides of the after sections of water at speed. The hull configuration and design characteristics are also such that the hull maintains displacement characteristics and the stability and seaworthy characteristics of a displacement type hull at all speeds while substantially reducing its wetted surface at speed.

The hull configuration and design characteristics, incident to the provision of deadrise angles increasing forwardly and progressively from a substantial value at the stern, enable the hull to maintain displacement characteristics and afford the stability and seaworthy characteristics at all speeds while materially decreasing the wetted surfaces of the hull at speed. Further contribution to the performance characteristics of the hull is also made by the correlation of speed length ratio, length beam ratio and displacement length ratio, described above.

Figure 13:
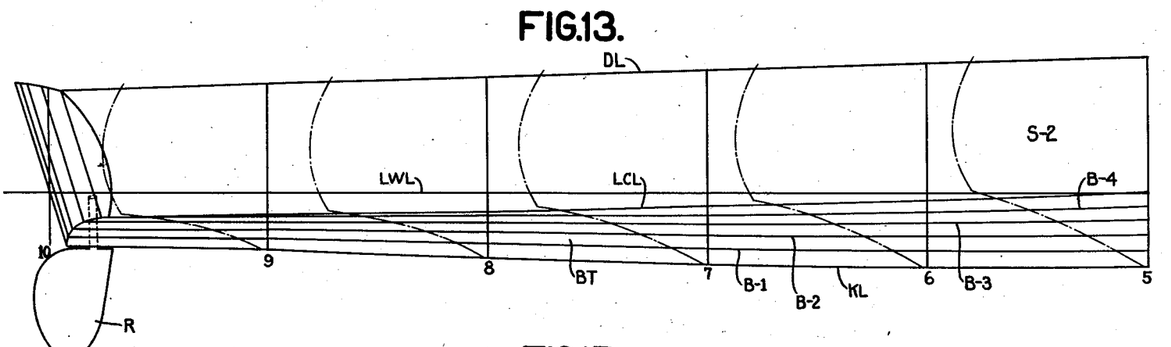
Figs. 13 and 13a are views similar to Figs. 1 and 1a and show a hull for a different type of vessel such as a high speed coastal launch, for example, one of 100 feet in length. In such vessels, while the bottom is the same as in the vessel of Figs. 1 and 1a, the side portions have a different contour.
Figure 13A:
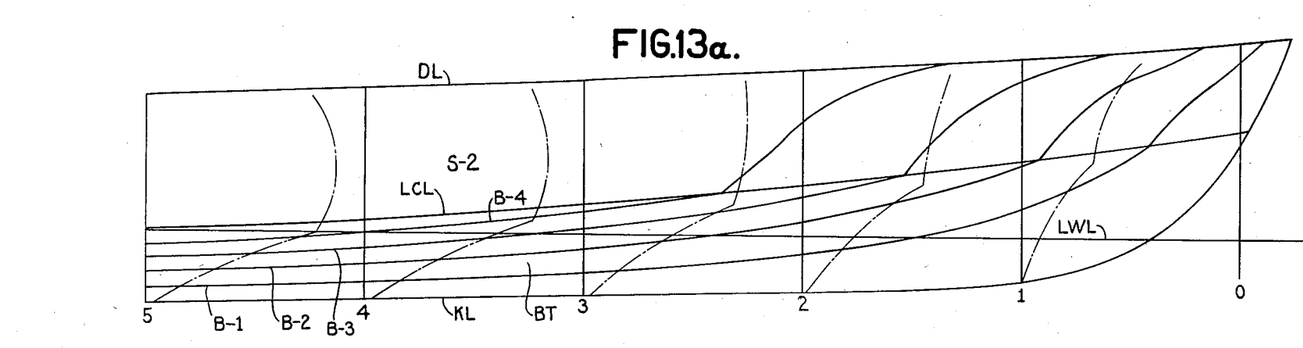
Figures 14, 16:
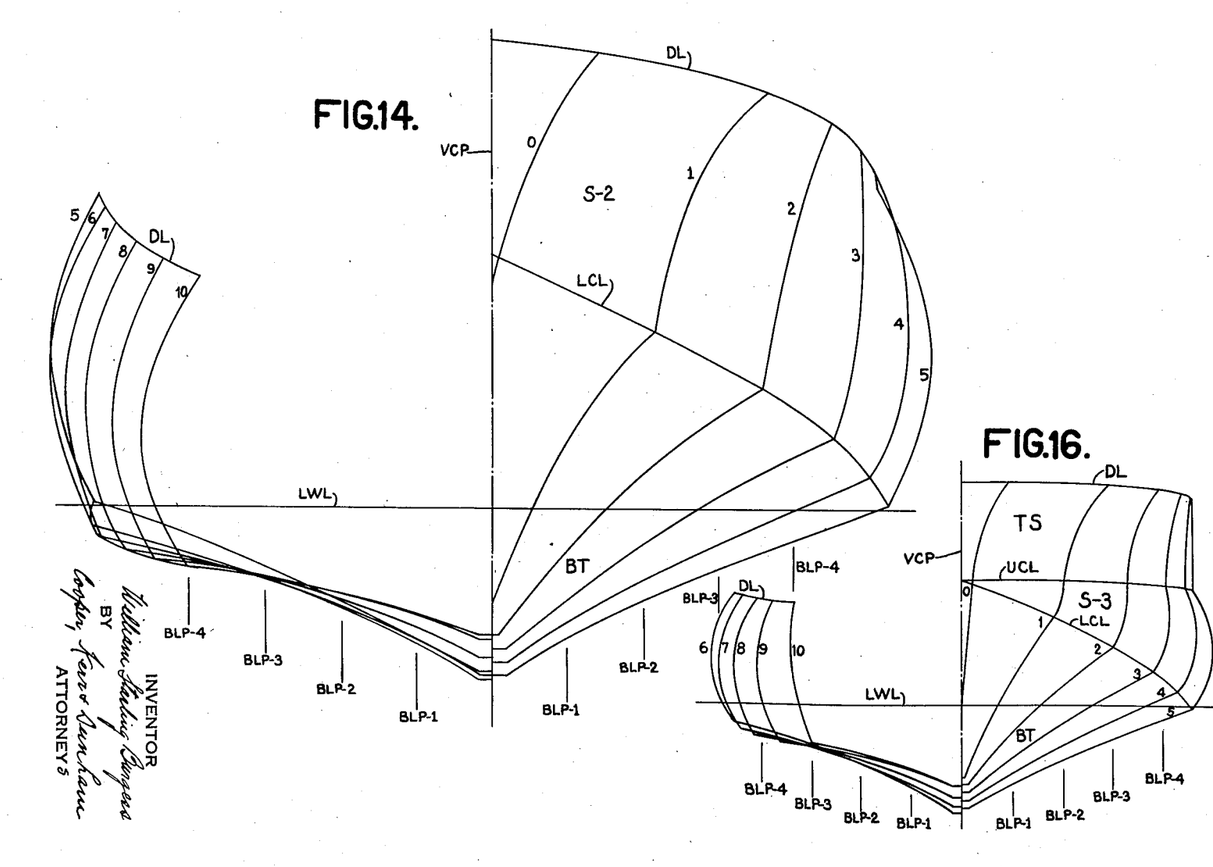
Figure 15:
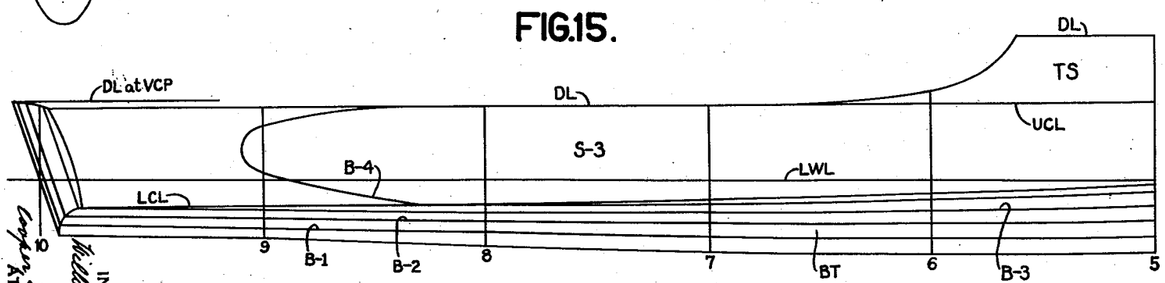
Figs. 15 and 15a are views similar to Figs. 1 and 1a and 13 and 13a, but for a still larger vessel; for example, one of about 250 feet in length. In this vessel a forecastle or top sides are shown above the upper chine.
Figure 15A:
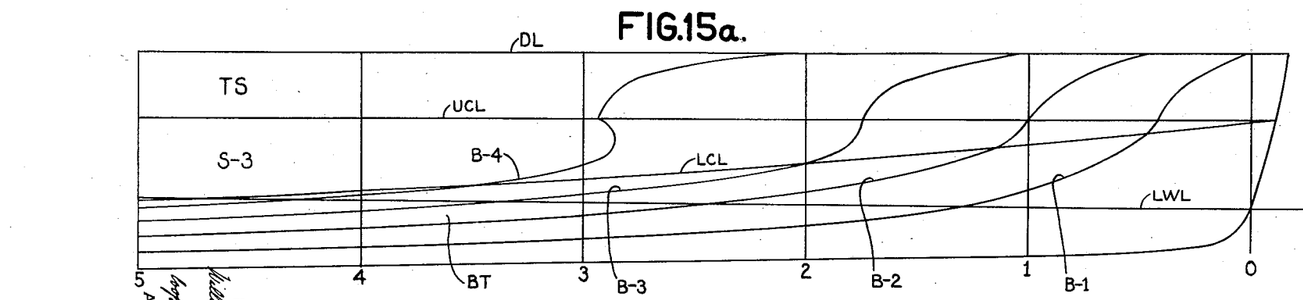

The configuration of the bottom is identical for the small high speed hull shown in Figs. 1, 1a, 2 and 2a and 5; the hull of the larger vessel shown in Figs. 13, 13a and 14, and the hull of the still larger vessel shown in Figs. 15, 15a and 16. The progression of angles of deadrise for these various hulls is the same and the T curve of Fig. 12 applies to all of the hulls shown and described. The characteristic differences of both the larger hulls is in the provision of substantially convex top side portions, see S—2 and S—3 (Figs. 14 and 16). These blister-like top sides are advantageous in maintaining lateral stability and cooperate upon heeling over of the vessel to effect a greater displacement on the heeled over side and therefore act to restore lateral trim. The convex configuration of the top sides S—2 and S—3 is also advantageous in suppressing pitching in a seaway.

With the largest vessel shown there is in addition to the convex sides S—3, the top side portion TS. With this particular form of hull there is a distinct upper chine line and such upper chine line meets the lower chine line at the bow diverging therefrom by a sharp angle as clearly shown in Fig. 16. This TS section is further advantageous in providing increased displacement forward upon pitching in a seaway.

The hull form shown in Figs. 13, 13a, has a speed length ratio of approximately 5.3 and a displacement length ratio of 47.7. With the larger hull form of Figs. 15, 15a and 16, the speed length ratio is 3.5 and the displacement length ratio is 48. Both hull forms of Figs. 15, 15a and 16 and 13 and 13a and 14 have a length beam ratio of 6.33.

With the lengthy hull forms shown in Figs. 13 and 13a, and 15 and 15a, racing boat speeds are obtainable by the combination of the characteristics of the hull bottom (previously explained), the speed length ratio characteristics, the length beam ratio characteristics and the displacement length ratio characteristics. The specific hull bottom described affords the characteristics of reducing wetted surface at speed, minimizing bow wave, greatly diminishes sternwave over present practice, delivering water to the propeller in an efficient manner, improving the water flow characteristic under the hull and along the sides thereof to the stern and smoothing out the wake so to practically eliminate turbulence and ebullition of the water leaving the stern at speed.

What I claim is:

1. A hull capable of high speed operation having improved seaworthy characteristics, maneuverability at all speeds and the characteristic of substantially reducing the wetted surface area thereof at speed while maintaining displacement type characteristics at all speeds, said hull comprising in combination, a bottom portion having bottom sections on each side of the plane of symmetry, which sections are concave throughout the length of the hull, said bottom portion being of such curvature that the buttock lines reverse downwardly aft of the center of buoyancy, said bottom sections having angles of deadrise which gradually increase in the afterbody from the stern to amidships and thereafter progressively increase more and more rapidly in the forebody to the stem, said angles of deadrise at all stations being adapted to provide improved seaworthiness and maneuverability characteristics and to maintain displacement characteristics at all speeds, said concave configuration of the bottom sections, reversal of curvature of the buttock lines of the bottom portion and angles of deadrise of the bottom sections all cooperating to provide a substantial reduction of wetted surface at speed while maintaining displacement characteristics at all speeds.

2. A hull adapted for high speed operation, with maintained maneuverability at all speeds and improved maneuverability at high speed, improved longitudinal and lateral stability and having a configuration and characteristic affording a decrease of wetted surface at speed while maintaining displacement characteristics at all speeds, said hull including a decrease wetted bottom surface portion thereof formed with warped surface portions on each side of the fore and aft plane of symmetry, shaped concave in cross-section throughout the length of at least said decreased wetted surface portion, said surface portions having a progressively increasing angle of deadrise from stern to stem increasing relatively more and more rapidly in the forebody as the stem is approached, said bottom portion also reversing downwardly aft the center of buoyancy, said deadrise angles of the afterbody section of the hull bottom producing a dihedral angle bottom surface portion which maintains substantial displacement effects at speed, said concave warped surface bottom portions cooperating to produce said lifting effects when the hull is driven at speed.

3. A hull comprising a bottom portion having angles of deadrise in the afterbody section which provide dihedral angles affording substantial displacement producing effects in the after section which are substantially maintained at speed, said angles of deadrise progressively increasing from stern to stem, said angles being of a minimum of approximately 13° adjacent the stern, said bottom portion comprising bottom sections having a concave configuration on each side of the plane of symmetry, said bottom portion having its bottom section shaped to provide a reversal of curvature of buttock lines after the center of buoyancy, said angle of deadrise at all stations and said concave configuration and reversal of buttock lines all cooperating to provide a hull adapted for high speed operation which will have the lateral stability characteristic of a displacement type hull, improved longitudinal stability characteristics over a planing and displacement type hull, and reduction of wetted surface characteristics of a planing type hull whereby increased speed, seaworthiness and desirable maneuverability characteristics at all speeds are obtained.

4. A hull adapted for high speed operation with the lateral stability characteristics of a displacement type hull, with increased speed characteristics afforded by the decrease of the wetted surface of the hull at speed and with maintained displacement characteristics at all speeds, said hull including a bottom surface portion comprising warped surface portions on each side of the fore and aft plane of symmetry of the hull, which warped surface portions are each shaped concave in cross-section throughout the portions of the hull in contact with water at speed, said warped surface portions having a progressively increasing angle of deadrise from stern to stem, which in cooperation with the concave configuration thereof provides a bottom configuration adapted to cause lifting of the hull at speed whereby the wetted surface of the hull is reduced at speed, said angles of deadrise in the afterbody section of the hull affording dihedral angle sections in said afterbody bottom section which will extend relatively deeply into the water and displace a substantial volume of water with the hull at rest or when lifted at speed, whereby displacement characteristics are maintained at all speeds and lateral stability characteristics of displacement type hulls secured.

5. The invention set forth in claim 4 in which the warped surface bottom portions of the hull in the forebody section are shaped with angles of deadrise which progressively increase from amidships toward the stem and which afford a bottom configuration which obviates pounding upon pitching in a seaway, said angles of deadrise of the bottom portions in the forebody also cooperating with the concave configuration thereof to assist in lifting the hull at speed to reduce the wetted surface and for also maintaining lateral stability at slower speeds.

6. A high speed displacement type hull having a length-beam ratio between 6 and 7.5, a displacement-length ratio between 45 and 50, and a speed-length ratio between 2.5 and 7.3, said hull having a pair of warped surface bottom portions symmetrical right and left about the fore and aft plane of symmetry and each of which warped surface portions is concave in transverse cross-section at all points along the hull, each bottom portion having an angle of deadrise which is in excess of 13° at the stern and which gradually increases to amidships and which thereafter more rapidly increases at successive stations toward the stem approaching 80° adjacent the stem, said bottom portions being of convex curvature in the forebody and which reverse downward in curvature aft of the center of buoyancy, said hull having the center of buoyancy at a position approximately 10% of the load water line length aft of amidships.

7. A displacement type high speed hull producing decreased wetted surface at speed having a bottom portion terminating in surface portions which are symmetrical right and left about the fore and aft plane of symmetry, with said surface portions upon each side of said plane being concave in cross-section throughout the portions of the hull in contact with water at speed and having angles of deadrise which in the afterbody increase progressively from adjacent the stern towards the stem and which adjacent the stern are at a minimum of approximately 13° and provide dihedral angles in the bottom which afford a substantial righting couple when the hull is listed and which angles of deadrise in the forebody provide a bottom configuration which obviate pounding in a seaway, said afterbody being reversed downwardly and cooperating with the other configuration of the bottom portion to reduce the wetted surface of the bottom at speed and to maintain longitudinal and lateral stability at speed and in a seaway.

8. A high speed displacement type hull having a length-beam ratio above 6 and below 7.5 and a displacement-length ratio between 47 and 51, and a speed-length ratio intermediate 2.5 and 7.3, said hull having warped bottom surface portions which are concave in transverse cross-sections at all points along the length of the hull from stern to stem, and with angles of deadrise in the afterbody which provide substantial displacement producing dihedral angles in the after section which maintain substantial displacement characteristics when the hull lifts at speed, said angles of deadrise increasing from the midship section to the stem at a progressively increasing rate, said bottom portion having buttock lines which are concave in the curvature of the forebody and which reverse in curvature at the center of buoyancy, said center of buoyancy being positioned approximately 10% of the load water line length aft of amidships.

9. A hull comprised of two warped bottom surface portions on each side of the plane of symmetry, said portions being concave in transverse cross-section at all points along the length of the hull, said bottom surface portions being of such curvature that buttock lines are curved in one direction in the forebody and reverse in curvature aft of the center of buoyancy, said bottom surface portions having an angle of deadrise of approximately 13° at the stern, said deadrise angles thereafter gradually increasing to amidships and thereafter progressively increasing in greater increments at successive stations towards the bow for the purpose described.

10. A high speed hull having a bottom surface portion which provides displacement characteristics which are maintained at all speeds and which by dynamic and hydrostatic lift reduces substantially the wetted surface areas thereof at speed, said hull having a bottom surface portion of continuously concave configuration at least at such stations which are in contact with the water at speed and provided with an angle of deadrise of approximately 13° adjacent the stern and with progressively increasing angles of deadrise at stations substantially forward of the stern whereby by the maintained displacement characteristics of the bottom portion increased seaworthiness and improved lateral stability are obtained and whereby by the reduction of wetted surfaces, by the configuration of the bottom portions, increased speed is secured.

11. A hull having a bottom portion which produces lifting effects when the hull is driven at speed, said hull having a bottom surface portion of continuously concave configuration at least at such stations which are in contact with the water at speed and provided with an angle of deadrise of approximately 13° adjacent the stern and with progressively increasing angles of deadrise at stations forward of the stern said hull also having a correlation of speed-length ratio, length-beam ratio and displacement-length ratio, which are correlated with one another and with the shape of the aforesaid bottom portion of the hull as to produce a hull capable of high speed operation with a substantial reduction of wetted surface area at speed, substantially maintained displacement characteristics at all speeds and improved lateral and longitudinal stability characteristics at all speeds.

12. A hull according to claim 11 wherein the speed-length ratio is between 2.5 and 7.3, the length-beam ratio is between 6 and 7.5 and the displacement-length ratio is between 45 and 50 wherein the configuration of the bottom portion of the hull affords speeds in substantial excess of the speeds obtainable according to the equation $$V \text{ (knots)} = \frac{\sqrt{27{,}150} \times \sqrt{\text{shaft H. P.}}}{\sqrt{\text{weights in lbs.}}}$$

13. A ship's hull comprising bottom surface portions symmetrical with respect to the vertical longitudinally center line plane, which are concave in transverse cross-section at all stations from stem to stern and which surfaces have deadrise angles at the respective stations which increase from approximately 13° adjacent the stern towards the bow and thereby provide twisted bottom surface portions affording lifting effects at speed, maintained displacement effects at speed and uninterrupted smooth flow of water from stem to stern, said bottom surfaces also being of such curvature that buttock lines are reversed downwardly in the after section of the afterbody to improve longitudinal trim and to assist in lifting the hull at speed.

14. A hull bottom comprising an afterbody and a forebody bottom portion, each of which is in contact with the water at speed and which curve downwardly and upwardly respectively with respect to water line planes, said bottom portions including two curved bottom surfaces on each side of the vertical center line plane, said surfaces being concave in transverse cross-section at least at all points along the length of the hull which are in contact with the water at speed, said bottom surface being so curved that buttock lines are curved in one direction in the forebody and reverse in curvature aft the center of buoyancy, said afterbody bottom portion having an angle of deadrise of approximately 13° at the stern, said deadrise angles thereafter increasing progressively towards the bow thereby affording substantial maintained displacement characteristics of the afterbody and portions of the forebody in contact with the water at speed.

15. A displacement type hull adapted for high speed operation with reduction of wetted surface area at speed, said hull comprising an afterbody and a forebody with the bottom therefor between the keel knuckle and chine lines of the hull, said afterbody bottom being formed with a pair of bottom defining sections of warped contour for contact with the water, said sections being disposed one on each side of the vertical center line plane of symmetry, said bottom also being shaped to afford buttock lines which are generally convex in the forebody and which reverse and change in curvature becoming concave in the afterbody, said afterbody bottom sections having angles of deadrise of substantial degree not less than a minimum of substantially 12 degrees at any station in the afterbody and increasing in degree towards the stem of the forebody to provide substantial displacement characteristics to the hull, which characteristics are substantially maintained at speed whereby lateral stability is improved, each of said sections at all stations in the afterbody being concave in cross-section from keel knuckle to chine lines, said concave configuration of the afterbody bottom cooperating with the angles of deadrise at the respective stations to provide a hull which has decreased wetted surface area characteristics at increased speeds.

16. A hull bottom comprising an afterbody and a forebody bottom portion, each of which is in contact with the water at speed and which curve downwardly and upwardly respectively with respect to water line planes, said bottom portions in the afterbody including two curved bottom surfaces on each side of the vertical center line plane, said surfaces being concave in transverse cross-section at least at all points along the length of the afterbody which are in contact with the water at speed, said bottom surface being so curved that buttock lines are curved in one direction in the forebody and reverse in curvature in the afterbody, said afterbody bottom portion having substantial angles of deadrise at the stern, said deadrise angles thereafter increasing progressively towards the junction of the afterbody and forebody thereby affording substantial maintained displacement characteristics of all stations of the after body in contact with the water at speed.

17. The hull comprising a bottom portion having angles of deadrise in the afterbody section which provide dihedral angles affording substantial displacement producing effects in the after section which are substantially maintained at speed, said angles of deadrise being of a minimum exceeding 11 degrees at all points in the afterbody adjacent the stern and progressively increasing in degree forward of said point of minimum angle of deadrise, said bottom portion comprising bottom sections having a concave configuration on each side of the plane of symmetry, said angles of deadrise and concave configuration of the afterbody cooperating to provide a hull adapted for high speed operation which will have the lateral stability characteristics of a displacement type hull, improved longitudinal stability characteristics over a planing and displacement type hull, and reduction of wetted surface characteristics of a planing type hull whereby increased speed, seaworthiness and desirable stability characteristics at all speeds are obtained.

18. A high speed displacement type hull having a forebody and afterbody both having warped bottom surface portions, said bottom surfaces being so curved that buttock lines are curved in one direction in the forebody and reverse in curvature in the afterbody aft the center of buoyancy, said afterbody bottom surface portions on each side of the vertical center line plane of symmetry being concave in transverse cross-section, said afterbody bottom portion having angles of deadrise of substantially increased degree over current practice, which angles of deadrise increase progressively from a point adjacent the stern towards the center of buoyancy, thereby affording substantial displacement characteristics in the afterbody which are substantially increased over current practice, said substantial displacement characteristics in the afterbody being substantially maintained upon reduction of the wetted surface area of the afterbody at speed.

WILLIAM STARLING BURGESS.

CERTIFICATE OF CORRECTION.

Patent No. 2,185,430. January 2, 1940.

WILLIAM STARLING BURGESS.

It is hereby certified that error appears in the printed specification of the above numbered patent requiring correction as follows: Page 2, first column, line 15, for "scale in" read scale is; page 3, second column, line 2, for the word "stern" read stem; page 4, first column, line 14, for "of" read by; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.